United States Patent
Cezanne et al.

(10) Patent No.: US 10,932,270 B2
(45) Date of Patent: Feb. 23, 2021

(54) TECHNIQUES AND APPARATUSES FOR USER EQUIPMENT-REQUESTED BEAM PAIR LINK PROCEDURE

(71) Applicant: QUALCOMM Incorporated, San Diego, CA (US)

(72) Inventors: Juergen Cezanne, Ocean Township, NJ (US); Bilal Sadiq, Basking Ridge, NJ (US); Tao Luo, San Diego, CA (US); Sundar Subramanian, San Diego, CA (US); Muhammad Nazmul Islam, Edison, NJ (US); Junyi Li, Chester, NJ (US); Vasanthan Raghavan, West Windsor Township, NJ (US); Navid Abedini, Raritan, NJ (US); Sumeeth Nagaraja, San Diego, CA (US); Raghu Narayan Challa, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 15/997,490

(22) Filed: Jun. 4, 2018

(65) Prior Publication Data

US 2018/0368125 A1  Dec. 20, 2018

Related U.S. Application Data

(60) Provisional application No. 62/520,483, filed on Jun. 15, 2017.

(51) Int. Cl.
*H04W 72/04* (2009.01)
*H04W 76/10* (2018.01)
(Continued)

(52) U.S. Cl.
CPC ........ *H04W 72/046* (2013.01); *H04B 7/0617* (2013.01); *H04B 7/0695* (2013.01);
(Continued)

(58) Field of Classification Search
CPC ... H04W 72/046; H04W 16/28; H04W 76/10; H04B 7/0695; H04B 7/088; H04B 7/0617
See application file for complete search history.

(56) References Cited

U.S. PATENT DOCUMENTS

| | | | |
|---|---|---|---|
| 2010/0159930 A1* | 6/2010 | Hagerman | H01Q 3/04 455/436 |
| 2010/0215027 A1* | 8/2010 | Liu | H04B 7/0695 370/338 |

(Continued)

OTHER PUBLICATIONS

Samsung—R11612509 Discussion on DL beam management procedure P-2 and P-3 3GPP TSG RAN WG1 meeting # 87 Nov. 2016 (Year: 2016).*

(Continued)

*Primary Examiner* — Rina C Pancholi
(74) *Attorney, Agent, or Firm* — Harrity & Harrity, LLP

(57) ABSTRACT

Certain aspects of the present disclosure generally relate to wireless communication. In some aspects, a user equipment (UE) may determine whether to perform a beam pair refinement procedure with regard to the UE and a base station; and/or transmit, to the base station, information regarding whether to perform the beam pair refinement procedure. In some aspects, a base station may receive, from a UE, information regarding a beam pair refinement procedure with regard to the UE; and/or perform the beam pair refinement procedure based at least in part on the information. Numerous other aspects are provided.

30 Claims, 8 Drawing Sheets

(51) Int. Cl.
*H04B 7/06* (2006.01)
*H04B 7/08* (2006.01)
*H04W 16/28* (2009.01)

(52) U.S. Cl.
CPC ............ *H04B 7/088* (2013.01); *H04W 76/10* (2018.02); *H04W 16/28* (2013.01)

(56) References Cited

U.S. PATENT DOCUMENTS

| | | | |
|---|---|---|---|
| 2017/0134964 A1* | 5/2017 | Yu | H04L 5/005 |
| 2017/0207845 A1* | 7/2017 | Moon | H04B 7/088 |
| 2017/0208494 A1* | 7/2017 | Moon | H04L 5/0048 |

OTHER PUBLICATIONS

Huawei Hisilicon—R1-1701694 CSI-RS design for beam management 3GPP TSG RAN WG1 meeting # 88 Feb. 2017 (Year: 2017).*
Huawei et al., "CSI-RS Design for Beam Management", 3GPP Draft; R1-1701694, 3rd Generation Partnership Project (3GPP), Mobile Competence Centre; 650, Route Des Lucioles; F-06921 Sophia-Antipolis Cedex; France, vol. RAN WG1, No. Athens, Greece; 20170213-20170217 Feb. 12, 2017, XP051208860, Retrieved from the Internet: URL:http://www.3gpp.org/ftpjMeetings_3GPP_SYNC/RAN1/Docs/ [retrieved on Feb. 12, 2017], 8 pages.
Intel Corporation: "Discussion on Beam Recovery in NR", 3GPP Draft; R1-1611982 Discussion on Beam Recovery in NR R2, 3rd Generation Partnership Project (3GPP), Mobile Competence Centre; 650, Route Des Lucioles; F-06921 Sophia-Antipolis Cedex; France, vol. RAN WG1, No. Reno, USA; 20161114-20161118 Nov. 6, 2016, XP051190792, Retrieved from the Internet: URL:http://www.3gpp.org/ftp/tsg_ran/WG1_RL1/TSGR1_87/Docs/ [retrieved on Nov. 6, 2016], 6 pages.
Intel Corporation: "Reference Signal and Procedure for Beam Management P-2 and P-3", 3GPP Draft; R1-1611986 Reference Signal and Procedure for Beam Management P-2 and P-3, 3rd Generation Partnership Project (3GPP), Mobile Competence Centre; 650, Route Des Lucioles; F-06921 Sophia-Antipolis Cedex; France, vol. RAN WG1, No. Reno, USA; 20161114-20161118 Nov. 6, 2016, XP051190796, Retrieved from the Internet:URL:http://www.3gpp.org/ftp/tsg_ran/WG1_RL1/TSGR1_87/Docs/ [retrieved on Nov. 6, 2016], 4 pages.
International Search Report and Written Opinion—PCT/US2018/036108—ISA/EPO—dated Sep. 12, 2018.
Samsung: "Discussion on DL Beam Management Procedures P-2 and P-3", 3GPP Draft; R1-1612509, 3rd Generation Partnership Project (3GPP), Mobile Competence Centre; 650, Route Des Lucioles; F-06921 Sophia-Antipolis Cedex; France, vol. RAN WG1, No. Reno, USA; 20161114-20161118 Nov. 13, 2016, XP051176456, Retrieved from the Internet: URL:http://www.3gpp.org/ftp/Meetings_3GPP_SYNC/RAN1/Docs/ [retrieved on Nov. 13, 2016], 4 pages.
Samsung: "Discussion on DL beam management procedures P-2 and P-3", 3GPP Draft; R1-1612509, 3rd Generation Partnership Project (3GPP), Mobile Competence Centre; 650, Route Des Lucioles; F-06921 Sophia-Antipolis Cedex; France, vol. RAN WG1, No. Reno, USA; 20161114-20161118 Nov. 4, 2016, XP051189385, Retrieved from the Internet: URL:http://www.3gpp.org/ftp/tsg_ran/WG1_RL1/TSGR1_87/Docs/ [retrieved on Nov. 4, 2016], 4 Pages.

* cited by examiner

TECHNIQUES AND APPARATUSES FOR USER EQUIPMENT-REQUESTED BEAM PAIR LINK PROCEDURE

CROSS-REFERENCE TO RELATED APPLICATIONS UNDER 35 U.S.C. § 119

This application claims priority to Provisional Patent Application No. 62/520,483, filed on Jun. 15, 2017, entitled "TECHNIQUES AND APPARATUSES FOR USER EQUIPMENT-REQUESTED BEAM PAIR LINK PROCEDURE," which is hereby expressly incorporated by reference herein.

INTRODUCTION

Aspects of the present disclosure generally relate to wireless communication, and more particularly to techniques and apparatuses for user equipment (UE)-requested beam link pair procedures.

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, etc.). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, Long Term Evolution (LTE), and New Radio (NR).

A wireless communication network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a new radio (NR) BS, a 5G Node B, and/or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method for wireless communication performed by a UE may include determining whether to perform a beam pair refinement procedure with regard to the UE and a base station; and transmitting, to the base station, information regarding whether to perform the beam pair refinement procedure.

In some aspects, a UE for wireless communication may include a memory and one or more processors configured to determine whether to perform a beam pair refinement procedure with regard to the UE and a base station; and transmit, to the base station, information regarding whether to perform the beam pair refinement procedure.

In some aspects, a non-transitory computer-readable medium may store one or more instructions for wireless communication. The one or more instructions, when executed by one or more processors of a UE, may cause the one or more processors to determine whether to perform a beam pair refinement procedure with regard to the UE and a base station; and transmit, to the base station, information regarding whether to perform the beam pair refinement procedure.

In some aspects, an apparatus for wireless communication may include means for determining whether to perform a beam pair refinement procedure with regard to the apparatus and a base station; and means for transmitting, to the base station, information regarding whether to perform the apparatus-side beam pair refinement procedure.

In some aspects, a method for wireless communication performed by a base station may include receiving, from a UE, information regarding a beam pair refinement procedure with regard to the UE; and performing the beam pair refinement procedure based at least in part on the information.

In some aspects, a base station for wireless communication may include a memory and one or more processors configured to receive, from a UE, information regarding a beam pair refinement procedure with regard to the UE; and perform the beam pair refinement procedure based at least in part on the information.

In some aspects, a non-transitory computer-readable medium may store one or more instructions for wireless communication. The one or more instructions, when executed by one or more processors of a base station, may cause the one or more processors to receive, from a UE, information regarding a beam pair refinement procedure with regard to the UE; and perform the beam pair refinement procedure based at least in part on the information.

In some aspects, an apparatus for wireless communication may include means for receiving, from a UE, information regarding a beam pair refinement procedure with regard to the UE; and means for performing the beam pair refinement procedure based at least in part on the information.

Aspects generally include a method, a user equipment, a non-transitory computer-readable medium, a base station, an apparatus, and a computer program product as substantially described herein with reference to and as illustrated by the accompanying drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
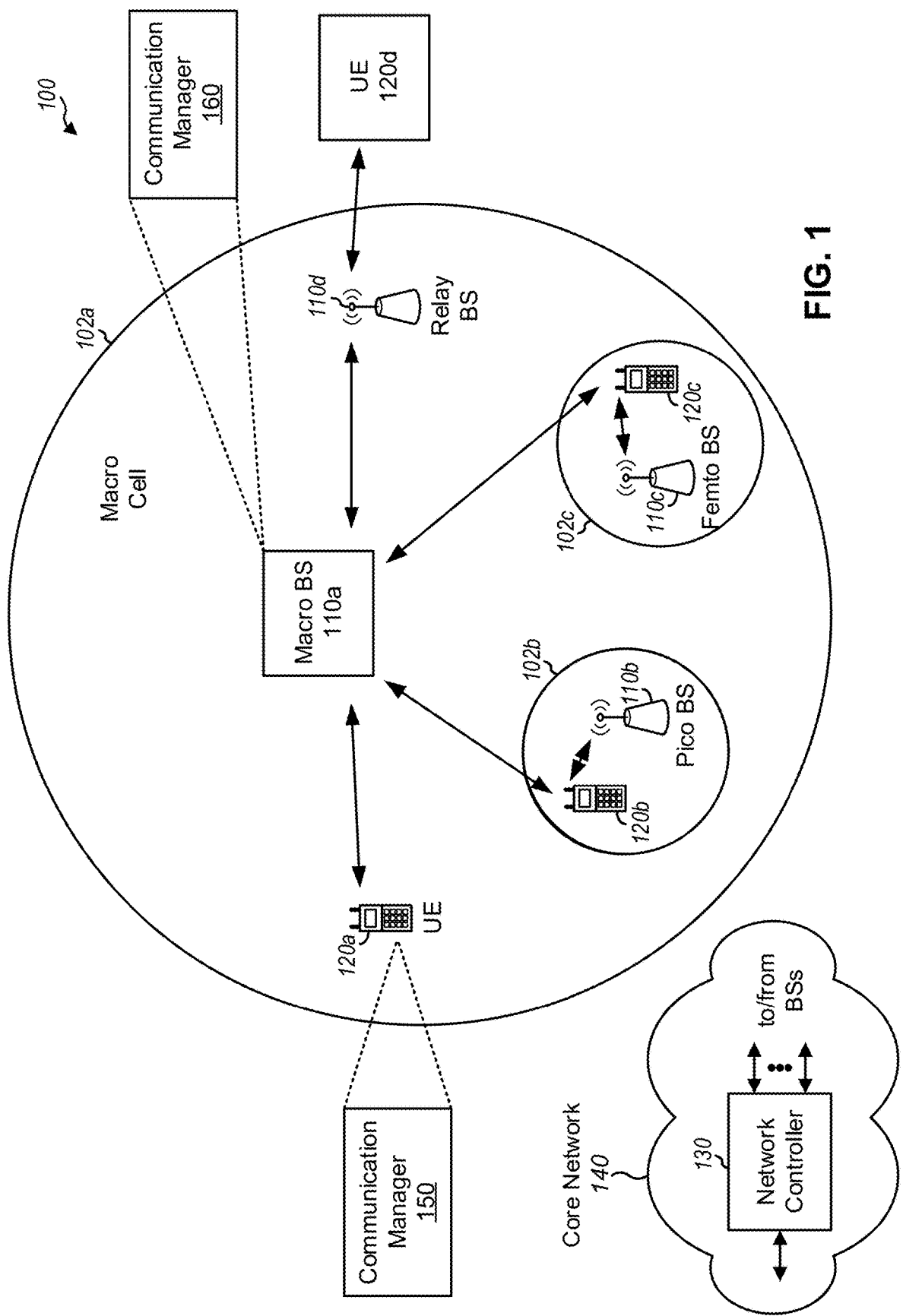
FIG. 1 is a block diagram conceptually illustrating an example of a wireless communication network, in accordance with various aspects of the present disclosure.

In some aspects, a UE may communicate with a base station using beamforming. Beamforming is a technique to form unicast beams between a UE and a base station so that performance of a radio link between the UE and the base station is improved. To perform beamforming, a base station may form a transmit beam directed to the UE, and the UE may form a receive beam to receive the transmit beam. The UE and the base station may perform a beam pair establishment procedure to establish the beam pair, and may perform base station-side beam pair refinement procedures and UE-side beam pair refinement procedures to refine the beams. In some aspects, the beam pair establishment procedure may be referred to as a P1 sweep, the base station-side beam pair refinement procedure may be referred to as a P2 sweep, and the UE-side beam pair refinement procedure may be referred to as a P3 sweep. In some cases, the refinement procedures may be scheduled or initiated by the base station.

The base station may know an expected benefit of the base station-side beam pair refinement procedure. For example, the base station may have information identifying a pool of available base station beams. Therefore, the base station can make an intelligent decision regarding whether to configure and perform a base station-side beam pair refinement procedure. However, the base station may not have access to similar information for the UE (e.g., a number of available UE beams, a UE beam directivity pattern, etc.). Therefore, it may be difficult for the base station to determine whether a UE-side beam pair refinement procedure is appropriate. Furthermore, when the base station performs the UE-side beam pair refinement procedure, the base station may have difficulty determining an appropriate length of time for which to perform the UE-side beam pair refinement procedure.

Techniques and apparatuses described herein provide messaging by a UE of information relating to a beam pair refinement procedure, such as a UE-side beam pair refinement procedure, and selective performance (or non-performance) of the UE-side beam pair refinement procedure by a base station that receives the information. For example, the base station can determine a length of the UE-side beam pair refinement procedure (e.g., based at least in part on a determined length included in the information relating to the beam pair refinement procedure and/or other information). In this way, beamforming performance of the UE and the base station is improved.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art.

Using the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over another aspect.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, etc. (collectively referred to as "elements"). These elements may be implemented using hardware, software, or combinations thereof. Whether such elements are implemented as hardware or software depends upon the particular application and design constraints imposed on the overall system.

It is noted that while aspects may be described herein using terminology commonly associated with 3G and/or 4G wireless technologies, aspects of the present disclosure can be applied in other generation-based communication systems, such as 5G and later, including NR technologies.

FIG. 1 is a diagram illustrating a network 100 in which aspects of the present disclosure may be practiced. The network 100 may be a 5G or NR network or some other wireless network, such as an LTE network. Wireless network 100 may include a number of base stations (BSs) 110 (shown as BS 110a, BS 110b, BS 110c, and BS 110d) and other network entities. A BS is an entity that communicates with user equipment (UEs) and/or other BSs, and may also be referred to as a Node B, an eNB, a gNB, a NR BS, a 5G NB, an access point, a transmit receive point (TRP), an access node (AN), and/or the like. Each BS may provide communication coverage for a particular geographic area. In 3GPP, the term "cell" can refer to a coverage area of a BS and/or a BS subsystem serving this coverage area, depending on the context in which the term is used. As used herein, the term "wireless node" may refer to a base station and/or a user equipment.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells.

In some examples, a cell may not necessarily be stationary, and the geographic area of the cell may move according to the location of a mobile BS. In some examples, the BSs may be interconnected to one another and/or to one or more other BSs or network nodes (not shown) in the access network 100 through various types of backhaul interfaces such as a direct physical connection, a virtual network, a wireless link (e.g., a wireless backhaul link), and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul. In some aspects, network controller 130 may be implemented in a core network 140.

Core network 140 may include one or more devices to communicate with and/or control BSs 110 and/or one or more devices to route packets through core network 140 to one or more other networks. For example, core network 140 may include a mobility management entity (MME), a serving gateway (SGW), a packet data network (PDN) gateway (PGW), a home subscriber server (HSS), a policy charging and rules function (PCRF) device, an authentication, authorization, and accounting (AAA) server, and/or the like.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, etc. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) UEs and/or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. MTC UEs, as well as other types of UEs, may be implemented as narrowband internet of things (NB-IoT) devices. UE 120 may be included inside a housing that houses components of UE 120, such as processor components, memory components, and/or the like. As used herein, the term "wireless node" may refer to a BS 110 and/or a UE 120.

In general, any number of wireless networks may be deployed in a given geographic area. Each wireless network may support a particular RAT and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

As shown in FIG. 1, UE 120 may include a communication manager 150. As described in more detail elsewhere herein, communication manager 150 of UE 120 may determine whether to perform a beam pair refinement procedure with regard to the UE and a BS 110; transmit, to the BS 110, information regarding whether to perform the beam pair refinement procedure; and/or may perform one or more other operations described herein. Communication manager 150 may include one or more components of FIG. 2, as described below.

As shown in FIG. 1, BS 110 may include a communication manager 160. As described in more detail elsewhere herein, communication manager 160 of BS 110 may receive, from a UE, information regarding a beam pair refinement procedure with regard to the UE; perform the beam pair refinement procedure based at least in part on the information; and/or may perform one or more other operations described herein. Communication manager 160 may include one or more components of FIG. 2, as described below.

As indicated above, FIG. 1 is provided as an example. Other examples are possible and may differ from what was described with regard to FIG. 1.

Figure 2:
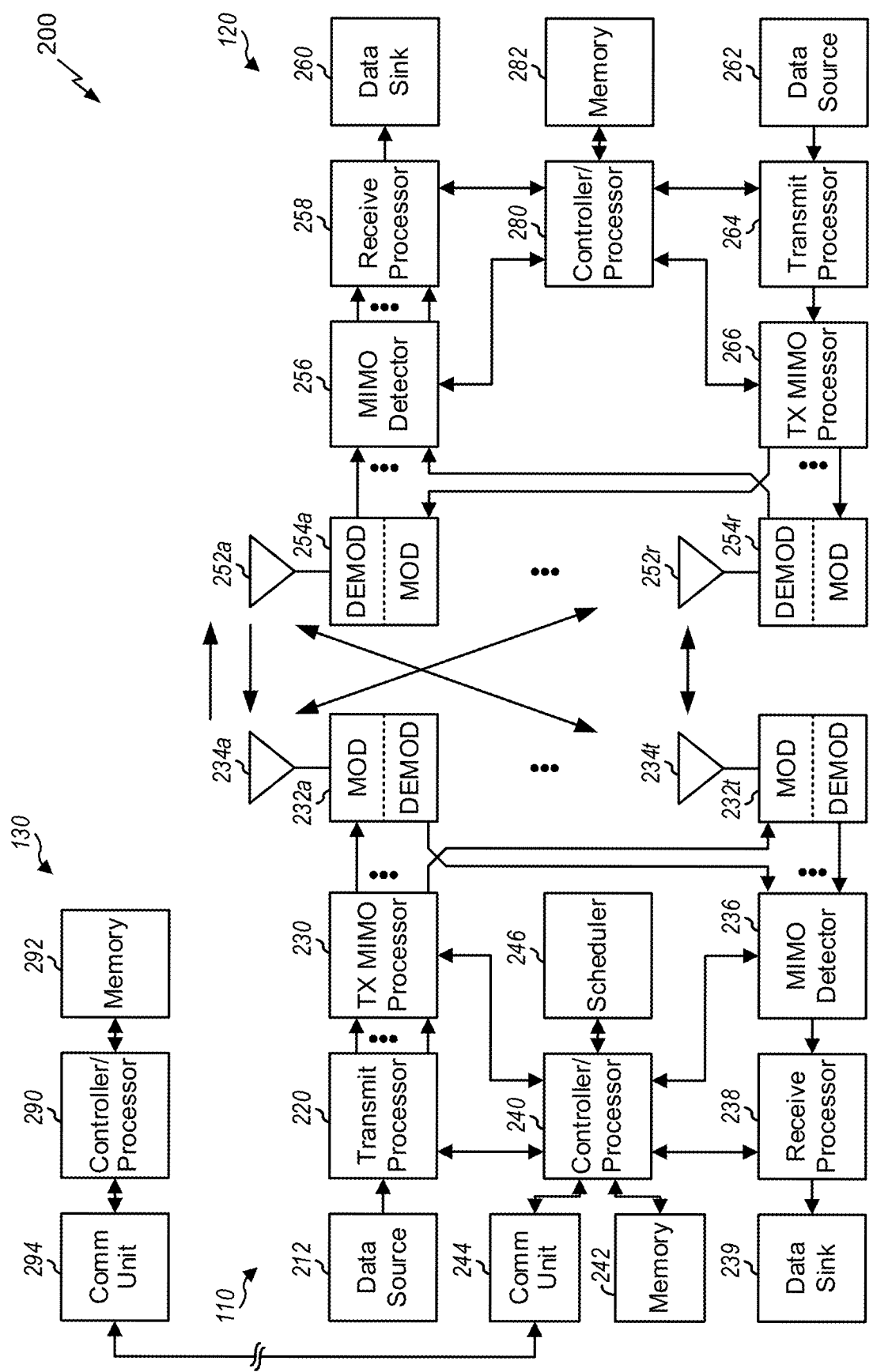
FIG. 2 shows a block diagram conceptually illustrating an example of a base station in communication with a UE in a wireless communication network, in accordance with various aspects of the present disclosure.

FIG. 2 shows a block diagram 200 of a design of BS 110 and UE 120, which may be one of the base stations and one of the UEs in FIG. 1. BS 110 may be equipped with T antennas 234a through 234t, and UE 120 may be equipped with R antennas 252a through 252r, where in general T≥1 and R≥1.

At BS 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI), etc.) and control information (e.g., CQI requests, grants, upper layer signaling, etc.) and provide overhead symbols and control symbols. Transmit processor 220 may also generate reference symbols for reference signals (e.g., demodulation reference signal (DMRS), cell-specific reference signal (CRS), and/or the like) and synchronization signals (e.g., a primary synchronization signal (PSS), a secondary synchronization signal (SSS), and/or the like).

A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from BS 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM, etc.) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like.

On the uplink, at UE 120, a transmit processor 264 may receive and process data from a data source 262 and control information (e.g., for reports comprising RSRP, RSSI, RSRQ, CQI, etc.) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, etc.), and transmitted to BS 110. At BS 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. BS 110 may include communication unit 244 and communicate to network controller 130 via communication unit 244. Network controller 130 may include communication unit 294, controller/processor 290, and memory 292. Memories 242 and 282 may store data and program codes for BS 110 and UE 120, respectively. A scheduler 246 may schedule UEs for data transmission on the downlink and/or uplink.

In some aspects, one or more components of UE 120 may be included in a housing. Controllers/processors 280 any other component(s) in FIG. 2 may direct the operation at UE 120 to perform operations associated with UE-requested beam pair link procedures, as described in more detail elsewhere herein. For example, controller/processor 280 and/or other processors and modules at UE 120, may perform or direct operations of UE 120 to perform one or more operations associated with UE-requested beam pair link procedures. For example, controller/processor 280 and/or other controllers/processors and modules at UE 120 may perform or direct operations of, for example, process 600 of FIG. 6 and/or other processes described herein. In some aspects, one or more of the components shown in FIG. 2 may be employed to perform example process 600 and/or other processes for the techniques described herein.

Additionally, or alternatively, the UE 120 may include means for determining whether to perform a beam pair refinement procedure with regard to the UE and a base station; means for transmitting, to the base station, information regarding whether to perform the beam pair refinement procedure; and/or the like.

Controllers/processors 240 any other component(s) in FIG. 2 may direct the operation at BS 110 to perform operations associated with UE-requested beam pair link procedures, as described in more detail elsewhere herein. For example, controller/processor 240 and/or other processors and modules at BS 110, may perform or direct operations of BS 110 to perform one or more operations associated with UE-requested beam pair link procedures. For example, controller/processor 240 and/or other controllers/processors and modules at BS 110 may perform or direct operations of, for example, process 700 of FIG. 7 and/or other processes described herein. In some aspects, one or more of the components shown in FIG. 2 may be employed to perform example process 700 and/or other processes for the techniques described herein.

Additionally, or alternatively, the BS 110 may include means for receiving, from a UE, information regarding a UE-side beam pair refinement procedure with regard to the UE; means for performing the UE-side beam pair refinement procedure based at least in part on the information; means for determining whether to perform the UE-side beam pair refinement procedure based at least in part on an amount of traffic associated with the UE; and/or the like.

Such means may include one or more components shown in FIG. 2. Additionally, or alternatively, communication manager 150 and/or communications manager 160 may include one or more components shown in FIG. 2.

As indicated above, FIG. 2 is provided as an example. Other examples are possible and may differ from what was described with regard to FIG. 2.

Figure 3A:
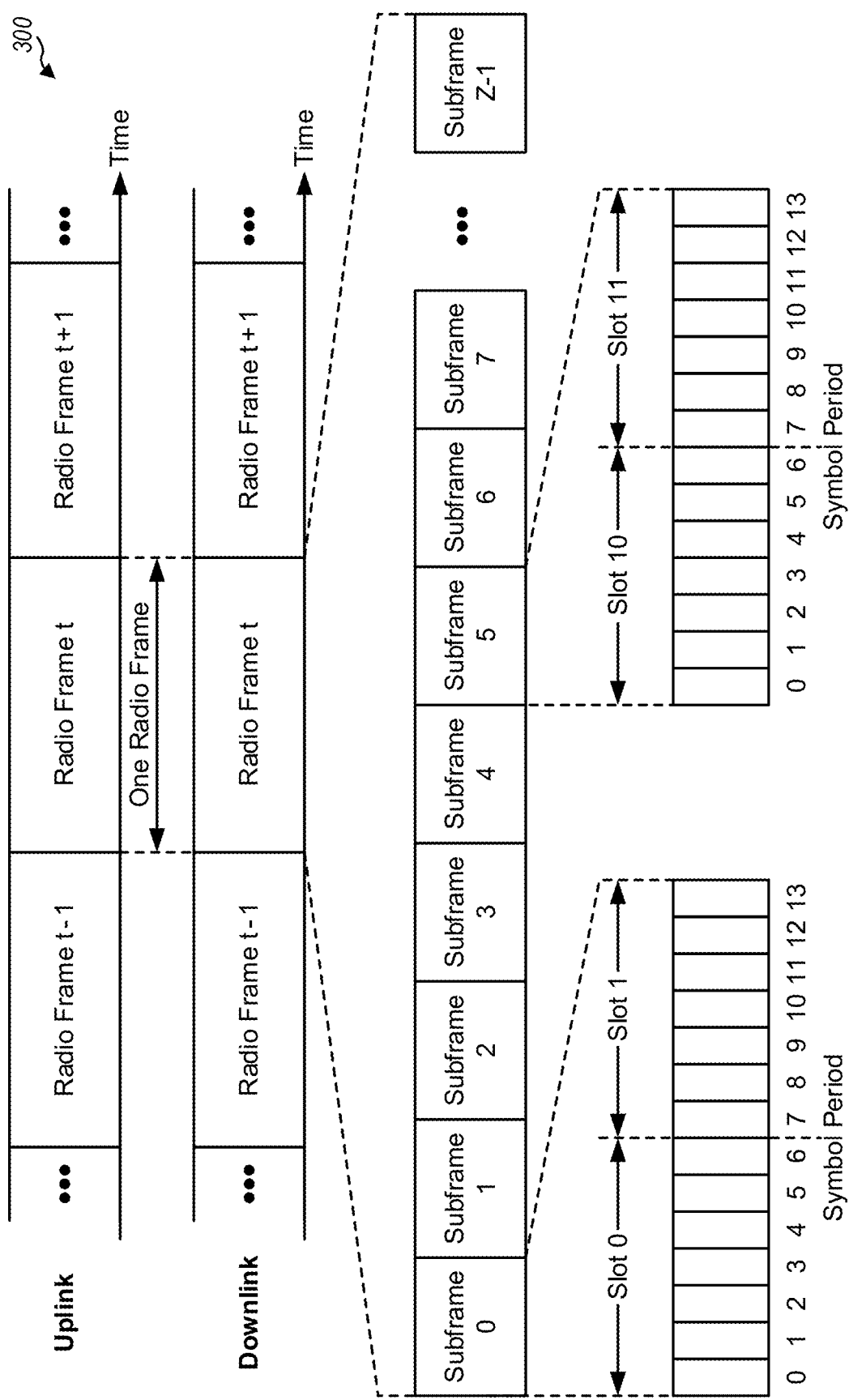
FIG. 3A is a block diagram conceptually illustrating an example of a frame structure in a wireless communication network, in accordance with various aspects of the present disclosure.

FIG. 3A shows an example frame structure 300 for frequency division duplexing (FDD) in a telecommunications system (e.g., NR). The transmission timeline for each of the downlink and uplink may be partitioned into units of radio frames. Each radio frame may have a predetermined duration and may be partitions into a set of Z (Z≥1) subframes (e.g., with indices of 0 through Z−1). Each subframe may include a set of slots (e.g., two slots per subframe are shown in FIG. 3A). Each slot may include a set of L symbol periods. For example, each slot may include seven symbol periods (e.g., as shown in FIG. 3A), fifteen symbol periods, and/or the like. In a case where the subframe includes two slots, the subframe may include 2L symbol periods, where the 2L symbol periods in each subframe may be assigned indices of 0 through 2L−1. In some aspects, a scheduling unit for the FDD may frame-based, subframe-based, slot-based, symbol-based, and/or the like.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol. Additionally, or alternatively, different configurations of wireless communication structures than those shown in FIG. 3A may be used.

In certain telecommunications (e.g., NR), a BS may transmit synchronization signals. For example, a BS may transmit a primary synchronization signal (PSS), a secondary synchronization signal (SSS), a tertiary synchronization signal (TSS), and/or the like, on the downlink for each cell supported by the BS. The PSS and SSS may be used by UEs for cell search and acquisition, and/or may be used by other BSs for automatic deployment in a wireless backhaul network. For example, the PSS may be used by UEs and/or BSs to determine symbol timing, and the SSS may be used by UEs and/or BSs to determine a physical cell identifier, associated with the BS, and frame timing. The BS may also transmit a physical broadcast channel (PBCH). The PBCH may carry some system information, such as system information that supports initial access by UEs and/or BSs.

In some aspects, the base station may transmit the PSS, the SSS, and/or the PBCH in accordance with a synchronization communication hierarchy (e.g., a synchronization signal (SS) hierarchy) including multiple synchronization communications (e.g., SS blocks), as described below in connection with FIG. 3B.

Figure 3B:
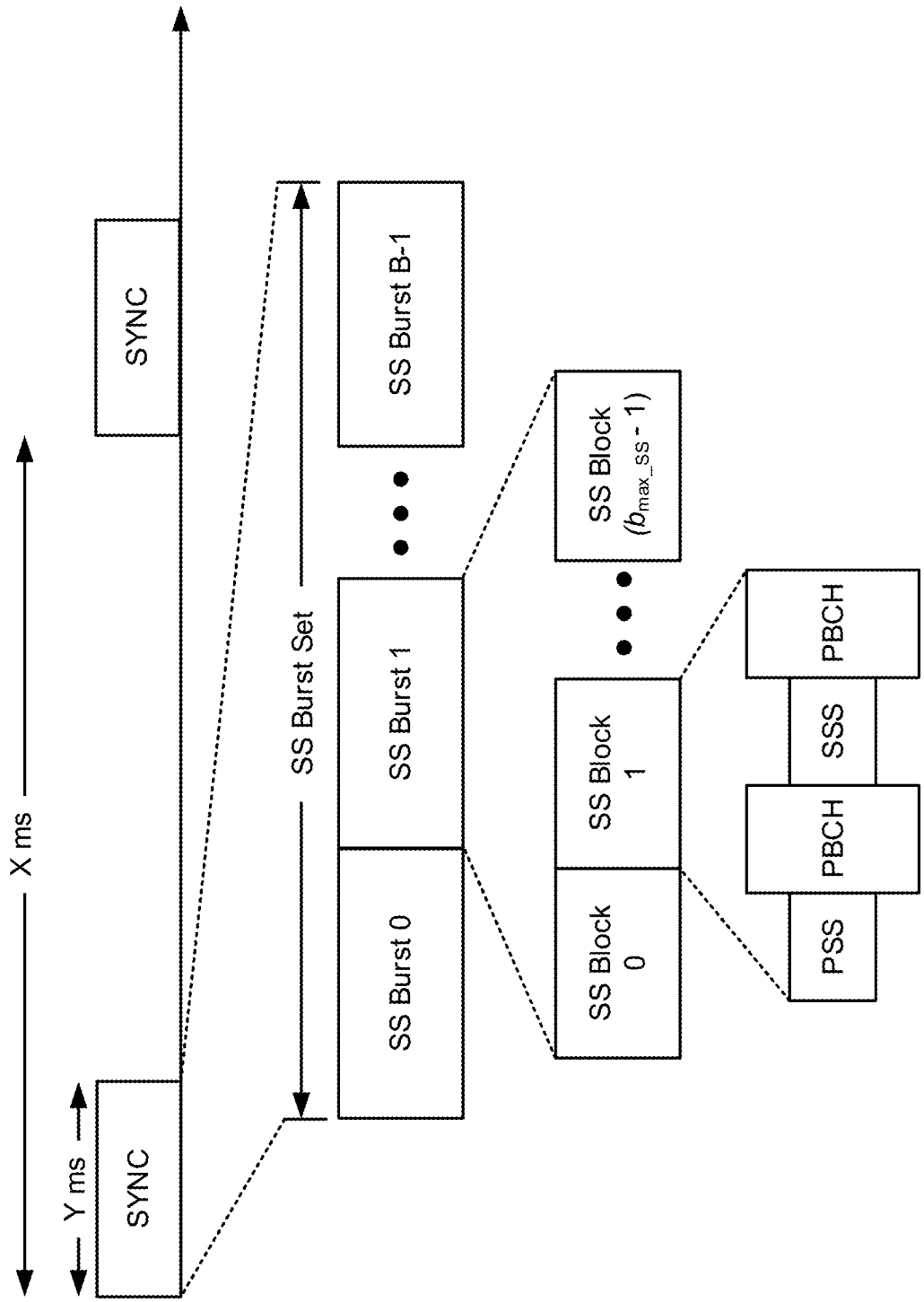
FIG. 3B is a block diagram conceptually illustrating an example synchronization communication hierarchy in a wireless communication network, in accordance with various aspects of the present disclosure.

FIG. 3B is a block diagram conceptually illustrating an example SS hierarchy, which is an example of a synchronization communication hierarchy. As shown in FIG. 3B, the SS hierarchy may include an SS burst set, which may include a plurality of SS bursts (identified as SS burst 0 through SS burst B−1, where B is a maximum number of repetitions of the SS burst that may be transmitted by the base station). As further shown, each SS burst may include one or more SS blocks (identified as SS block 0 through SS block ($b_{max\_SS-1}$), where $b_{max\_SS-1}$ is a maximum number of SS blocks that can be carried by an SS burst. In some aspects, different SS blocks may be beam-formed differently. An SS burst set may be periodically transmitted by a wireless node, such as every X milliseconds, as shown in FIG. 3B. In some aspects, an SS burst set may have a fixed or dynamic length, shown as Y milliseconds in FIG. 3B.

The SS burst set shown in FIG. 3B is an example of a synchronization communication set, and other synchronization communication sets may be used in connection with the techniques described herein. Furthermore, the SS block shown in FIG. 3B is an example of a synchronization communication, and other synchronization communications may be used in connection with the techniques described herein.

In some aspects, an SS block includes resources that carry the PSS, the SSS, the PBCH, and/or other synchronization signals (e.g., a TSS) and/or synchronization channels. In some aspects, multiple SS blocks are included in an SS burst, and the PSS, the SSS, and/or the PBCH may be the same across each SS block of the SS burst. In some aspects, a single SS block may be included in an SS burst. In some aspects, the SS block may be at least four symbol periods in length, where each symbol carries one or more of the PSS (e.g., occupying one symbol), the SSS (e.g., occupying one symbol), and/or the PBCH (e.g., occupying two symbols).

In some aspects, a synchronization communication (e.g., an SS block) may include a base station synchronization communication for transmission, which may be referred to as a Tx BS-SS, a Tx gNB-SS, and/or the like. In some aspects, a synchronization communication (e.g., an SS block) may include a base station synchronization communication for reception, which may be referred to as an Rx BS-SS, an Rx gNB-SS, and/or the like. In some aspects, a synchronization communication (e.g., an SS block) may include a user equipment synchronization communication for transmission, which may be referred to as a Tx UE-SS, a Tx NR-SS, and/or the like. A base station synchronization communication (e.g., for transmission by a first base station and reception by a second base station) may be configured for synchronization between base stations, and a user equipment synchronization communication (e.g., for transmission by a base station and reception by a user equipment) may be configured for synchronization between a base station and a user equipment.

In some aspects, a base station synchronization communication may include different information than a user equipment synchronization communication. For example, one or more base stations synchronization communications may exclude PBCH communications. Additionally, or alternatively, a base station synchronization communication and a user equipment synchronization communication may differ with respect to one or more of a time resource used for transmission or reception of the synchronization communication, a frequency resource used for transmission or reception of the synchronization communication, a periodicity of the synchronization communication, a waveform of the synchronization communication, a beamforming parameter used for transmission or reception of the synchronization communication, and/or the like.

In some aspects, the symbols of an SS block are consecutive, as shown in FIG. 3B. In some aspects, the symbols of an SS block are non-consecutive. Similarly, in some aspects, one or more SS blocks of the SS burst may be transmitted in consecutive radio resources (e.g., consecutive symbol periods) during one or more subframes. Additionally, or alternatively, one or more SS blocks of the SS burst may be transmitted in non-consecutive radio resources.

In some aspects, the SS bursts may have a burst period, whereby the SS blocks of the SS burst are transmitted by the BS according to the burst period. In other words, the SS blocks may be repeated during each SS burst. In some aspects, the SS burst set may have a burst set periodicity, whereby the SS bursts of the SS burst set are transmitted by the BS according to the fixed burst set periodicity. In other words, the SS bursts may be repeated during each SS burst set.

The BS may transmit system information, such as system information blocks (SIBs) on a physical downlink shared channel (PDSCH) in certain subframes. The BS may transmit control information/data on a physical downlink control channel (PDCCH) in B symbol periods of a subframe, where B may be configurable for each subframe. The BS may transmit traffic data and/or other data on the PDSCH in the remaining symbol periods of each subframe.

As indicated above, FIGS. 3A and 3B are provided as examples. Other examples are possible and may differ from what was described with regard to FIGS. 3A and 3B.

Figure 4:
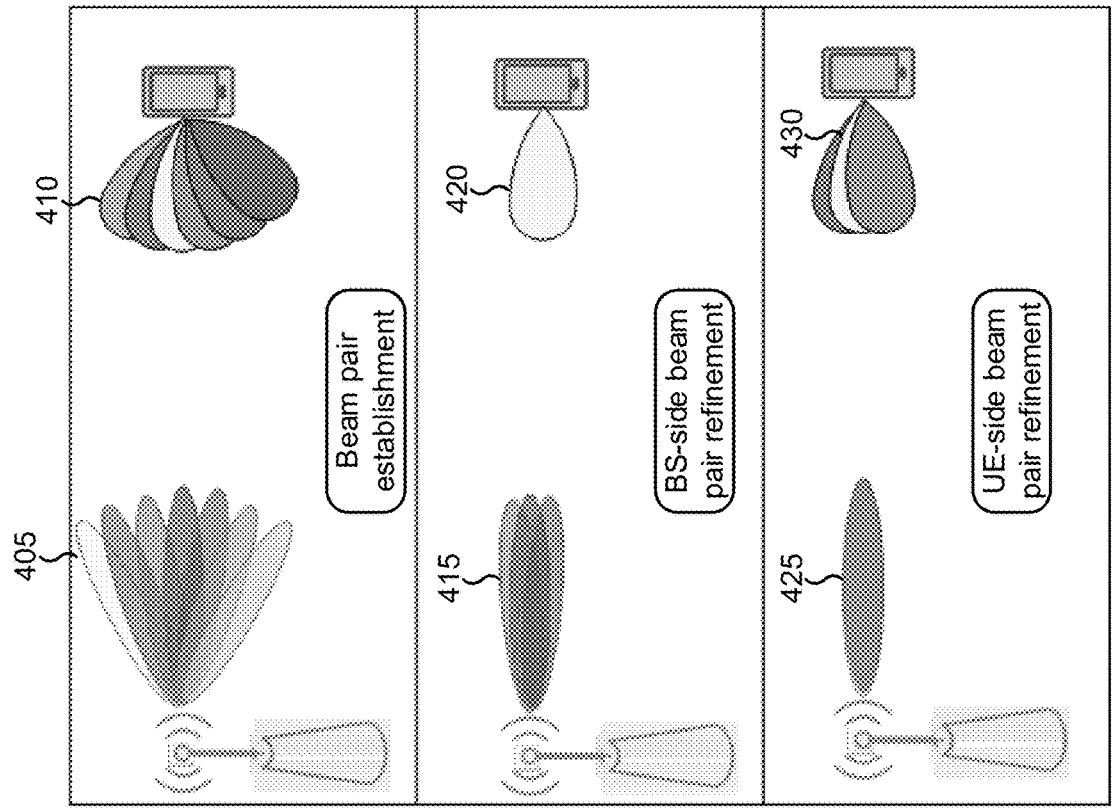
FIG. 4 is diagram illustrating an example of beam link establishment and refinement procedures, in accordance with various aspects of the present disclosure.

FIG. 4 is diagram illustrating an example 400 of beam link establishment and refinement procedures, in accordance with various aspects of the present disclosure. A UE 120 and a BS 110 may establish at least one beam pair link (BPL). In some aspects, at least one BPL may need to be established for network access. Furthermore, a new BPL may need to be established later (e.g., for different purposes than network access). For example, the BS 110 may determine to use different BPLs for different channels, for communicating with different transmission points (TRPs), as fallback BPLs in case an existing BPL fails, and/or the like. The UE 120 may monitor the quality of a BPL, and the BS 110 (and/or a UE 120) may refine a BPL from time to time.

As shown in FIG. 4, a BS 110 and a UE 120 may perform a beam pair establishment procedure. For example, in 5G/NR, the network may use a P1 procedure (sometimes referred to herein as a P1 sweep) to enable the discovery of new BPLs. For that purpose, the BS 110 may periodically transmit different symbols of a reference signal on beams 405 formed in different spatial directions. The UE 120 may attempt to find an appropriate receive beam 410 for successful reception of at least a symbol of the reference signal, referred to herein as the P1-signal. For example, the UE 120 may sweep through available receive beams, and may use a different receive beam during each occurrence of the periodic P1-signal to find the appropriate receive beam 410.

Once the UE successfully receives a symbol of the P1-signal, the UE 120 may determine that a BPL has been discovered. In some aspects, the UE 120 may not wait until the UE 120 has found the best receive beam, since this could delay further actions. The UE 120 may measure an RSRP of the BPL, and may provide a report identifying a symbol index of the P1-signal and the RSRP of the BPL to the BS 110. Such a report may identify one or more BPLs established between the UE 120 and the BS 110.

As further shown, the BS 110 and the UE 120 may perform a BS-side beam pair refinement procedure, sometimes referred to herein as a P2 procedure or a P2 sweep. As shown, the BS 110 may transmit symbols of a reference signal using different transmit beams 415. In some aspects, the transmit beams 415 may be spatially close to the established beam of the BPL (e.g., within approximately two degrees). As further shown, the UE 120 may use a receive beam 420 (e.g., without using different beams) for the P2 sweep. In some aspects, the beam 420 may be the BPL beam identified by the UE 120 during performance of the beam pair establishment procedure. In some aspects, the beams 415, used for the P2 sweep, may be different from the beams 405 for the P1 sweep, in that the beams 415 may be spaced closer together or may be more focused. The UE 120 measures the RSRP for the beams 415 and transmits information identifying a best beam, of the beams 415, to the BS 110. Thus, the BS 110 determines a best beam 415 that provides the best performance for the UE 120. It will be appreciated, however, that the UE 120 need not identify (and the BS 110 need not determine) a best beam of the beams 415 and that, instead, the UE 120 may identify (and the BS 110 may determine) any suitable or usable beam of the beams 415 using any suitable criteria, factors and/or thresholds.

As further shown, the BS 110 and the UE 120 may perform a UE-side beam pair refinement procedure, sometimes referred to herein as a P3 procedure or a P3 sweep. Notably, the BS 110 may be described herein as performing the UE-side beam pair refinement procedure, and such description includes performance of one or more base station-side operations of the UE-side beam pair refinement procedure by the BS 110. Similarly, the UE 120 may be described herein as performing the UE-side beam pair refinement procedure, and such description includes performance of one or more UE-side operations of the UE-side beam pair refinement procedure by the UE 120. As shown, the BS 110 may transmit symbols of a reference signal using a single beam 425, such as a BPL beam. In some aspects, the beam 425 may include the BPL beam identified by the UE 120 during performance of the BS-side beam pair refinement procedure. As further shown, the UE 120 may configure multiple, different receive beams 430, and may listen for the symbols on each beam. In some aspects, the receive beams 430, used for the P3 sweep, may be different from the receive beams 410 for the P1 sweep, in that the receive beams 430 may be spaced closer together or may be more focused than the receive beams 410. The UE 120 measures the RSRP for the beams 430 and transmits information identifying a best beam, of the beams 430, to the BS 110. Thus, the UE 120 selects a best beam 430 that provides the best performance for the UE 120. It will be appreciated, however, that the UE 120 need not identify nor select a best beam of the beams 430 and that, instead, the UE may identify or select any suitable or usable beam of the beams 430 using any suitable criteria, factors and/or thresholds.

The BS 110 may perform the UE-side beam pair refinement procedure for a particular length of time (e.g., or a particular number of repetitions, or according to a different limitation). For example, the BS 110 may transmit the symbols for the particular length of time. When the particular length of time is too short, the UE 120 may not have time to identify a best beam. When the particular length of time is too long, air interface resources, resources of the BS 110, and/or resources of the UE 120 may be wasted. Using techniques and apparatuses described herein, the UE 120 can signal whether to perform a UE-side beam pair refinement procedure, can signal an improvement expected to be achieved by performing the UE-side beam pair refinement procedure, can signal a determined length of the UE-side beam pair refinement procedure, and/or can request that a second UE-side beam pair refinement be performed if a first UE-side beam pair refinement is too short. Thus, beam performance is improved.

As indicated above, FIG. 4 is provided as an example. Other examples are possible and may differ from what was described with regard to FIG. 4.

Figure 5:
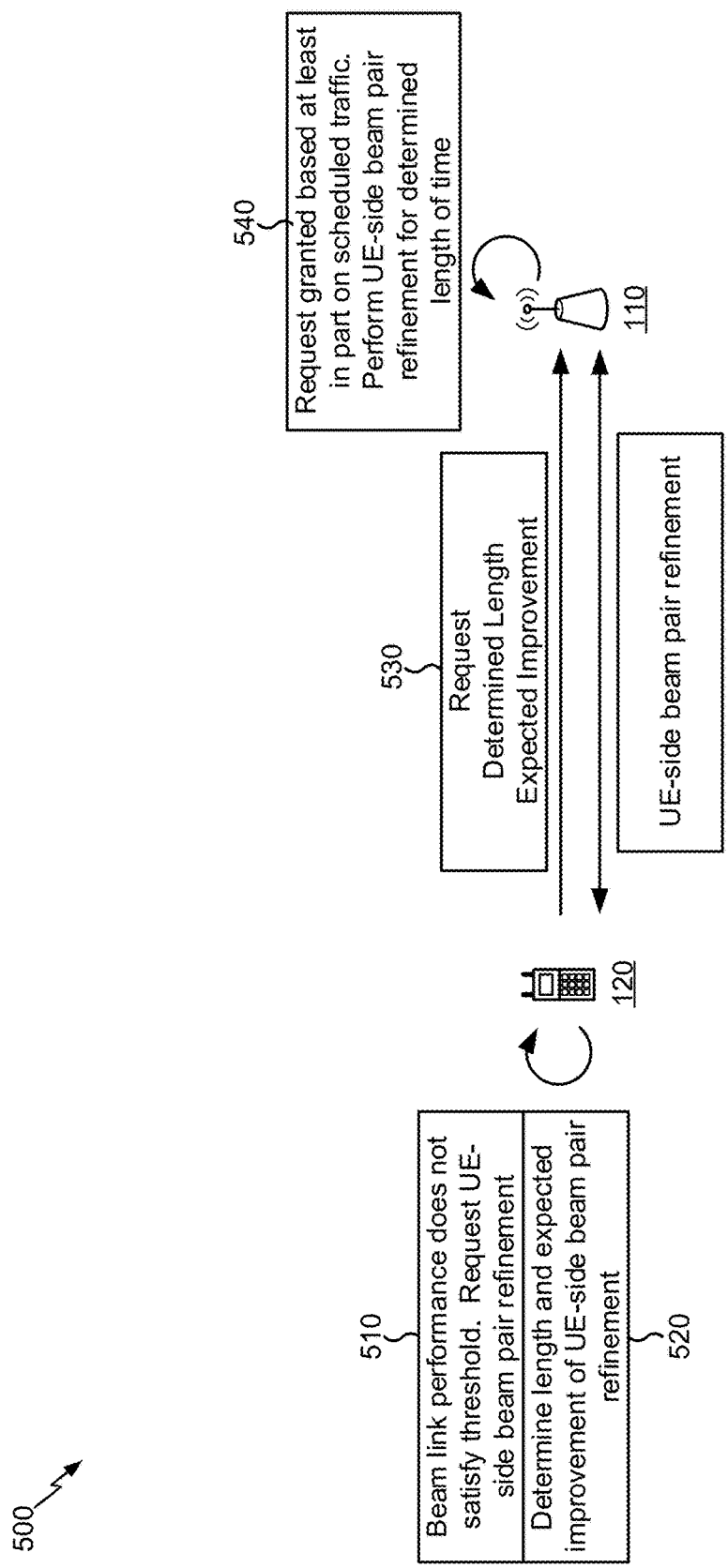
FIG. 5 is diagram illustrating an example of requesting a beam pair refinement procedure, in accordance with various aspects of the present disclosure.

FIG. 5 is diagram illustrating an example 500 of requesting a UE-side beam pair refinement procedure, in accordance with various aspects of the present disclosure. For the purpose of FIG. 5, assume that a UE 120 has performed a beam pair establishment procedure to establish a BPL with a BS 110.

As shown by reference number 510, the UE 120 may determine to request a UE-side beam pair refinement. For example, the UE 120 may determine to request the UE-side beam pair refinement when performance of the BPL does not satisfy a threshold (e.g., an RSRP threshold and/or the like). Additionally, or alternatively, the UE 120 may determine to request the UE-side beam pair refinement when the BPL is established. Additionally, or alternatively, the UE 120 may determine to request the UE-side beam pair refinement based at least in part on an improvement predicted to be achieved by performing the UE-side beam pair refinement. Additionally, or alternatively, the UE 120 may determine to request the UE-side beam pair refinement based at least in part on an instruction from the BS 110. For example, the BS 110 may transmit an instruction to the UE 120 indicating that the UE 120 is to request a UE-side beam pair refinement if the performance of the BPL does not satisfy the threshold.

As shown by reference number 520, the UE 120 may determine a length of the UE-side beam pair refinement. The length determined by the UE (sometimes referred to as the determined length) is a length of a waveform that is desired by the UE in association with performance of the UE-side beam pair refinement procedure. In other words, the determined length may identify a length of a waveform that the UE determines is sufficient to allow the UE-side beam pair refinement procedure to be performed. For example, the determined length may be based at least in part on the number of receive beams remaining to be evaluated during the UE-side beam pair refinement. Additionally, or alternatively, the determined length may be based at least in part on path loss experienced by the UE 120. For example, a higher path loss may correspond to a worse signal to noise ratio (SNR). The UE 120 may mitigate the influence of thermal and other noise (thereby reducing path loss) by increasing the measurement duration. Since the receive beam stays constant during the measurement, a higher path loss may therefore lead to an increase of the determined length. Conversely, a smaller path loss may allow for a reduction of the determined length, but the shorter determined length may require the UE 120 to switch receive beams faster. For example, the UE 120 may have a beam switching speed at which the UE 120 is capable of switching receive beams. In some aspects, the determined length may be based at least in part on the beam switching speed. For example, the UE 120 may request a determined length that permits the UE 120 to switch through each beam that is to be tested.

In some aspects, the measurement duration of a beam, and therefore the determined length, may be an integer multiple of the duration of a symbol or a sub-symbol. Additionally, or alternatively, a sub-symbol duration can be achieved by using a scaled numerology technique. Additionally, or alternatively, a sub-symbol duration can be achieved by the use of symbols wherein only every nth subcarrier contains energy. This may be referred to as an interleaved FDMA-based reference signal.

As further shown by reference number 520, the UE 120 may determine an expected improvement associated with the UE-side beam pair refinement procedure. For example, the UE 120 may determine an expected array gain improvement for the BPL after the UE-side beam pair refinement procedure is performed. The expected array gain improvement may be based at least in part on channel characteristics of the BPL, measurements regarding the BPL, and/or the like. The expected improvement may enable the BS 110 to determine whether the UE-side beam pair refinement procedure is appropriate. For example, when the expected improvement satisfies a threshold, the BS 110 may determine that the request for the UE-side beam pair refinement should be granted and may schedule the UE-side beam pair refinement procedure. Conversely, when the expected improvement does not satisfy the threshold, the BS 110 may determine that the request for the UE-side beam pair refinement should be denied, and may not schedule the UE-side beam pair refinement procedure.

As shown by reference number 530, the UE 120 may transmit information regarding whether to perform the UE-side beam pair refinement procedure. In some aspects, as shown, the information regarding whether to perform the UE-side beam pair refinement procedure includes a request for the UE-side beam pair refinement. As further shown, the request may identify the determined length and/or the expected improvement associated with the UE-side beam pair refinement. In some aspects, the UE 120 may transmit the determined length and/or the expected improvement as information for the BS 110 to use to determine whether to perform the UE-side beam pair refinement procedure. For example, the UE 120 may periodically report the determined length and/or the expected improvement, and/or the like. In some aspects, the request for the UE-side beam pair refinement (or information associated with the request for the UE-side beam pair refinement) may be provided by a device other than the UE 120. For example, in a case wherein the BS 110 is a neighbor BS (e.g., a neighbor cell) of the UE 120, the information may be received from (and/or provided by) a serving BS (e.g., a serving cell) of the UE 120. In such a case, the UE 120 may provide the information to the serving BS 110, and the serving BS 110 may provide the information to the neighbor BS 110 (e.g., based at least in part on an indication that the information is to be provided to the neighbor BS).

In some aspects, the UE 120 may determine that it is not beneficial to perform the UE-side beam pair refinement procedure and may transmit information, to the BS 110, that indicates that determination. For example, the UE 120 may transmit information indicating that the UE-side beam pair refinement procedure is not to be performed. In some aspects, the UE 120 may transmit information that the BS 110 can use to determine that the UE-side beam pair refinement procedure is not to be performed. In this case, the BS 110 may receive the information, may determine that it would not be beneficial to perform the UE-side beam pair refinement procedure, and may notify the UE 120 that the UE-side beam pair refinement procedure is not to be performed (or may not perform the UE-side beam pair refinement procedure).

As shown by reference number 540, the BS 110 may grant the request for the UE-side beam pair refinement. In some aspects, the BS 110 may determine whether to grant or deny the request based at least in part on information associated with the UE 120, such as an amount of traffic scheduled for the UE 120, the expected improvement, the determined length, and/or the like. As further shown, the UE 120 and the BS 110 may perform the UE-side beam pair refinement (i.e., the UE 120 may perform one or more UE-side operations of the UE-side beam pair refinement procedure, and the BS 110 may perform one or more base station-side operations of the UE-side beam pair refinement procedure). In some aspects, the BS 110 may perform the UE-side beam pair refinement based at least in part on the request for the UE-side beam pair refinement. For example, the BS 110 may perform the UE-side beam pair refinement based at least in part on the determined length indicated by the UE 120. As another example, the BS 110 may perform the UE-side beam pair refinement based at least in part on the measurement durations of beams, as indicated by the UE 120. Thus, UE-side beam pair refinement is performed based at least in part on signaling from a UE 120 requesting the UE-side beam pair refinement. Further, the UE-side beam pair refinement is improved based at least in part on the determined length and/or other information provided by the UE 120, which improves performance of beamforming.

As indicated above, FIG. 5 is provided as an example. Other examples are possible and may differ from what was described with regard to FIG. 5.

Figure 6:
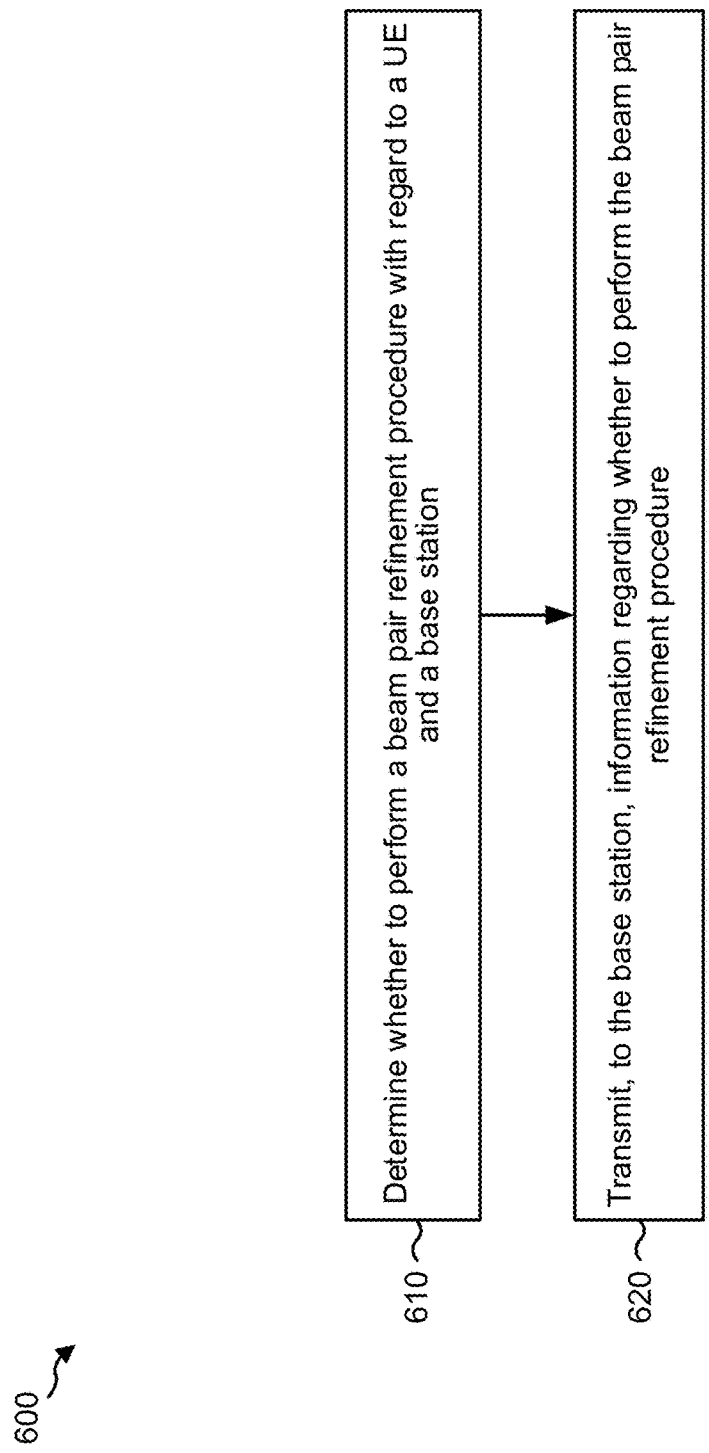
FIG. 6 is a diagram illustrating an example process performed, for example, by user equipment, in accordance with various aspects of the present disclosure.

FIG. 6 is a diagram illustrating an example process 600 performed, for example, by a wireless communication device (e.g., UE 120), in accordance with various aspects of the present disclosure.

As shown in FIG. 6, in some aspects, process 600 may include determining whether to perform a beam pair refinement procedure with regard to a UE and a base station (block 610). For example, the wireless communication device (e.g., using controller/processor 280 and/or the like) may determine whether to perform a beam pair refinement procedure with regard to the wireless communication device and a base station (e.g., the BS 110), as described in more detail elsewhere herein. In some aspects, the beam pair refinement procedure may be a UE-side beam pair refinement procedure.

As further shown in FIG. 6, in some aspects, process 600 may include transmitting, to the base station, information regarding whether to perform the beam pair refinement procedure (block 620). For example, the wireless communication device (e.g., using controller/processor 280, transmit processor 264, TX MIMO processor 266, MOD 254, antenna 252, and/or the like) may transmit, to the base station, information regarding whether to perform the beam pair refinement procedure, as described in more detail elsewhere herein.

Process 600 may include additional aspects, such as any single aspect or any combination of aspects described below and/or in connection with one or more other processes described elsewhere herein.

With respect to process 600, in some aspects, the information identifies a length of a waveform of the beam pair refinement procedure. In some aspects, the length is based at least in part on a number of beams that are to be evaluated in the beam pair refinement procedure. In some aspects, the length is based at least in part on a path loss between the UE and the base station. In some aspects, the length is based at least in part on a beam switching speed of the UE. In some aspects, the information identifies an expected improvement of array gain after performing the beam pair refinement procedure. In some aspects, the information is transmitted after a beam pair establishment procedure is performed between the UE and the base station. In some aspects, the beam pair refinement procedure has a sub-symbol measurement duration based at least in part on a symbol with a differently scaled numerology. In some aspects, the beam pair refinement procedure has a sub-symbol measurement duration based at least in part on a subcarrier spacing technique.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
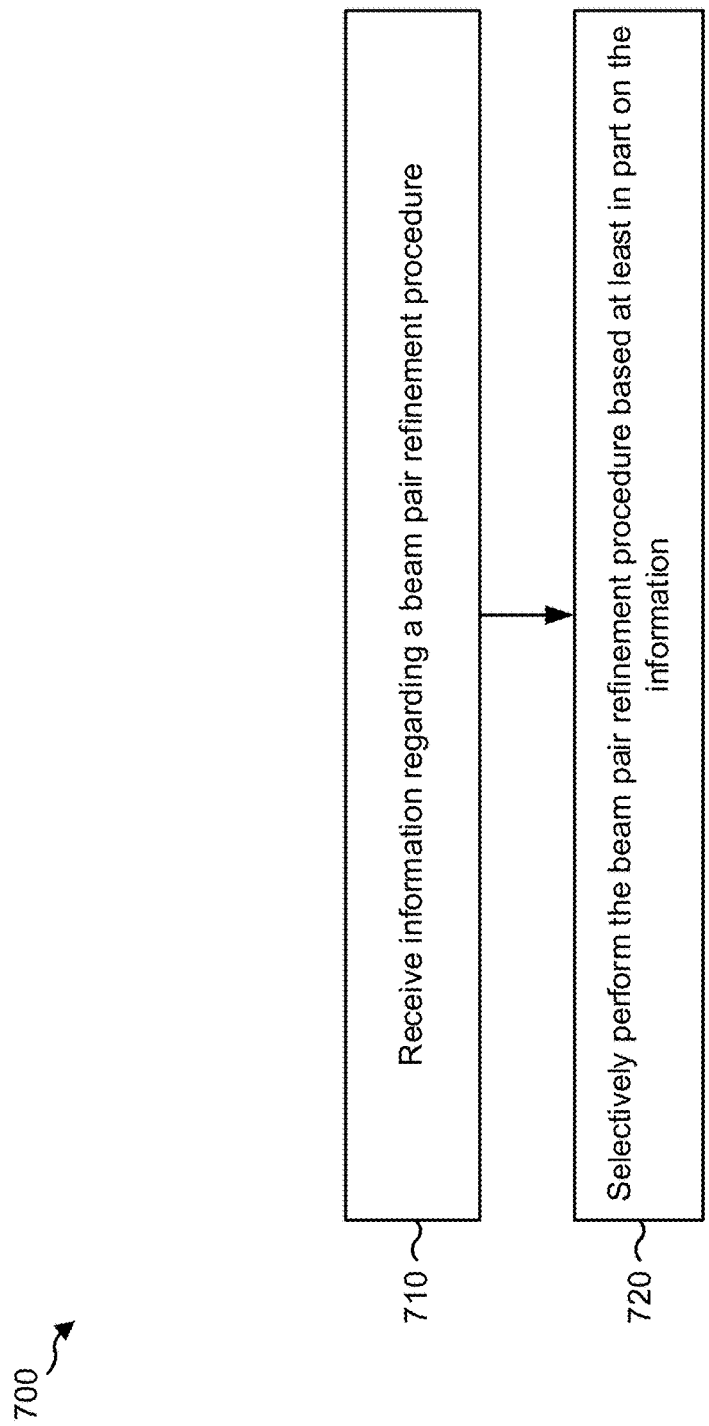
FIG. 7 is a diagram illustrating an example process performed, for example, by a base station, in accordance with various aspects of the present disclosure.

FIG. 7 is a diagram illustrating an example process 700 performed, for example, by a base station (e.g., BS 110), in accordance with various aspects of the present disclosure.

As shown in FIG. 7, in some aspects, process 700 may include receiving information regarding a UE-side beam pair refinement procedure (block 710). For example, the base station (e.g., using antenna 234, DEMOD 232, MIMO detector 236, receive processor 238, controller/processor 240, and/or the like) may receive information regarding a beam pair refinement procedure, as described in more detail elsewhere herein. In some aspects, the beam pair refinement procedure may be a UE-side beam pair refinement procedure.

As further shown in FIG. 7, in some aspects, process 700 may include selectively performing the beam pair refinement procedure based at least in part on the information (block 720). For example, the base station (e.g., using controller/processor 240 (e.g., using transmit processor 220, TX MIMO processor 230, MOD 232, using antenna 234, DEMOD 232, MIMO detector 236, receive processor 238, controller/processor 240, and/or the like) may selectively perform the beam pair refinement procedure based at least in part on the information, as described in more detail elsewhere herein.

Process 700 may include additional aspects, such as any single aspect or any combination of aspects described below and/or in connection with one or more other processes described elsewhere herein.

With respect to process 700, in some aspects, the information identifies a length of a waveform of the beam pair refinement procedure, and the beam pair refinement procedure is performed based at least in part on the length. In some aspects, the information identifies an expected improvement in array gain associated with the beam pair refinement procedure, and the base station schedules the beam pair refinement procedure based at least in part on the expected improvement. In some aspects, the base station may determine whether to perform the beam pair refinement procedure based at least in part on an amount of traffic associated with the UE. In some aspects, the information is received from a serving BS of the UE, and the BS is a neighbor BS of the UE. In some aspects, the information is received from the serving BS based at least in part on the information indicating that the information is to be provided to the neighbor BS. In some aspects, the beam pair refinement procedure is embedded in another beam pair procedure.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

The foregoing disclosure provides illustration and description, but is not intended to be exhaustive or to limit the aspects to the precise form disclosed. Modifications and variations are possible in light of the above disclosure or may be acquired from practice of the aspects.

As used herein, the term component is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of possible aspects. In fact, many of these features may be combined in ways not specifically recited in the claims and/or disclosed in the specification. Although each dependent claim listed below may directly depend on only one claim, the disclosure of possible aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," and/or the like are intended to be open-ended terms. Further, the phrase "based at least in part on" is intended to mean "based, at least in part, on" unless explicitly stated otherwise.

What is claimed is:

1. A method of wireless communication performed by a user equipment (UE), comprising:
   receiving, from a base station, an instruction regarding a threshold;
   determining to request a beam pair refinement procedure with regard to the UE and the base station when a performance of a beam pair link does not satisfy the threshold and based at least in part on an improvement predicted to be achieved by performing the beam pair refinement procedure; and
   transmitting, to the base station, information based on determining to request the beam pair refinement procedure.

2. The method of claim 1, wherein the information identifies a length of a waveform of the beam pair refinement procedure,
   wherein the length is determined by the UE.

3. The method of claim 2, wherein the length is based at least in part on a number of UE-side beams that are to be evaluated in the beam pair refinement procedure.

4. The method of claim 2, wherein the length is based at least in part on a path loss between the UE and the base station.

5. The method of claim 2, wherein the length is based at least in part on a beam switching speed of the UE.

6. The method of claim 1,
   wherein the information identifies the improvement, and
   wherein the improvement is an expected improvement of array gain after performing the beam pair refinement procedure.

7. The method of claim 1, wherein the information is transmitted after a beam pair establishment procedure is performed between the UE and the base station.

8. The method of claim 1, wherein the beam pair refinement procedure has a sub-symbol measurement duration based at least in part on a symbol with a differently scaled numerology.

9. The method of claim 1, wherein the information regarding whether to perform the beam pair refinement procedure includes a request to perform the beam pair refinement procedure.

10. A method of wireless communication performed by a base station, comprising:
    transmitting, to a user equipment (UE), an instruction including information identifying a threshold;
    receiving a request to perform a beam pair refinement procedure with regard to the UE after the UE determines to request the beam pair refinement procedure based on a performance of a beam pair link not satisfying the threshold and based at least in part on an improvement predicted to be achieved by performing the beam pair refinement procedure; and
    selectively performing the beam pair refinement procedure based at least in part on the request.

11. The method of claim 10, wherein the request identifies a length of a waveform of the beam pair refinement procedure, and the beam pair refinement procedure is performed based at least in part on the length,
    wherein the length was determined by the UE.

12. The method of claim 10,
    wherein the request identifies the improvement,
    wherein the improvement is an expected improvement in array gain associated with the beam pair refinement procedure, and
    wherein selectively performing the beam pair refinement procedure comprises:
        scheduling the beam pair refinement procedure based at least in part on the expected improvement.

13. The method of claim 10, further comprising:
    determining whether to perform the beam pair refinement procedure based at least in part on an amount of traffic associated with the UE.

14. The method of claim 10, wherein the request is received from the UE.

15. The method of claim 10, wherein the request is received from a serving base station (BS) of the UE, and wherein the base station is a neighbor base station (BS) of the UE.

16. The method of claim 15, wherein the request is received from the serving BS based at least in part on the request indicating that the request is to be provided to the neighbor BS.

17. The method of claim 10, wherein the beam pair refinement procedure is embedded in another beam pair procedure.

18. A user equipment (UE) for wireless communication, comprising:
a memory; and
at least one processor operatively coupled to the memory, the memory and the at least one processor configured to:
receive, from a base station, an instruction regarding a threshold;
determine to request a beam pair refinement procedure with regard to the UE and the base station when a performance of a beam pair link does not satisfy the threshold and based at least in part on an improvement predicted to be achieved by performing the beam pair refinement procedure; and
transmit, to the base station, information based on determining to request the beam pair refinement procedure.

19. The UE of claim 18, wherein the information identifies a length of a waveform of the beam pair refinement procedure,
wherein the length is determined by the UE.

20. The UE of claim 19, wherein the length is based at least in part on a number of UE-side beams that are to be evaluated in the beam pair refinement procedure.

21. The UE of claim 19, wherein the length is based at least in part on a path loss between the UE and the base station.

22. The UE of claim 19, wherein the length is based at least in part on a beam switching speed of the UE.

23. The UE of claim 18,
wherein the information identifies the improvement, and
wherein the improvement is an expected improvement of array gain after performing the beam pair refinement procedure.

24. The UE of claim 18, wherein the information is transmitted after a beam pair establishment procedure is performed between the UE and the base station.

25. The UE of claim 18, wherein the beam pair refinement procedure has a sub-symbol measurement duration based at least in part on symbol with a differently scaled numerology.

26. The UE of claim 18, wherein the information regarding whether to perform the beam pair refinement procedure includes a request to perform the beam pair refinement procedure.

27. A base station for wireless communication, comprising:
a memory; and
at least one processor operatively coupled to the memory, the memory and the at least one processor configured to:
transmit, to a user equipment (UE), an instruction including information identifying a threshold;
receive a request to perform a beam pair refinement procedure with regard to the UE after the UE determines to request the beam pair refinement procedure based on a performance of a beam pair link not satisfying the threshold and based at least in part on an improvement predicted to be achieved by performing the beam pair refinement procedure; and
selectively perform the beam pair refinement procedure based at least in part on the request.

28. The base station of claim 27, wherein the request identifies a length of a waveform of the beam pair refinement procedure, and the beam pair refinement procedure is performed based at least in part on the length,
wherein the length was determined by the UE.

29. The base station of claim 27,
wherein the request identifies the improvement,
wherein the improvement is an expected improvement in array gain associated with the beam pair refinement procedure, and
wherein, when selectively performing the beam pair refinement procedure, the memory and the at least one processor are configured to:
schedule the beam pair refinement procedure based at least in part on the expected improvement.

30. The base station of claim 27, wherein the at least one processor is further to:
determine whether to perform the beam pair refinement procedure based at least in part on an amount of traffic associated with the UE.

* * * * *